Feb. 5, 1946.　　　P. D. WURZBURGER　　　2,394,351
VIBRATION-PROOF COUPLING
Filed Nov. 10, 1942　　　3 Sheets-Sheet 1

INVENTOR.
PAUL D. WURZBURGER
BY
John C. Kerr
ATTORNEYS

Feb. 5, 1946.  P. D. WURZBURGER  2,394,351
VIBRATION-PROOF COUPLING
Filed Nov. 10, 1942  3 Sheets-Sheet 2

INVENTOR.
PAUL D. WURZBURGER
BY
John C. Kerr
ATTORNEYS

Patented Feb. 5, 1946

2,394,351

UNITED STATES PATENT OFFICE 2,394,351

VIBRATIONPROOF COUPLING

Paul D. Wurzburger, Cleveland, Ohio

Application November 10, 1942, Serial No. 465,106

13 Claims. (Cl. 285—122)

This invention relates to tube or pipe couplings, unions or connectors which I will refer to generally as tube couplings, and more particularly to improvements combining desirable hydraulic and mechanical characteristics with ability to resist failure or impairment arising from vibration. This invention in many of its aspects may be regarded as an improvement upon the types of couplings shown in United States patents to Kreidel, Nos. 2,139,413, 2,171,217, 2,201,404, 2,211,856 and 2,230,116, and my prior Patent No. 2,258,528. From this point of view my present invention relates to improving the vibration resisting characteristics of this type of coupling. From other points of view my invention lies in the novel arrangement and combination of elements through which I have provided a coupling having greatly enhanced vibration-resisting characteristics along with the capacity to hold and withstand high fluid pressures while possessing great mechanical strength and a positive grip upon the tube to be coupled without substantial restriction of the fluid passage therethrough.

The problem to which my invention is addressed as a solution is one of long standing in the art and one that has become increasingly aggravated, as for example in the airplane field where failures due to vibration in pipe lines, tubing, and tube couplings have most serious aspects. As the demands for increased performance have come along with the desired use of higher fluid pressures, lighter metals, thinner walled tubing and lighter coupling parts, these things have all combined to make it increasingly difficult to provide a coupling to meet these increasingly arduous and somewhat antithetical requirements. Generally speaking, the prior advances in the coupling art have tended to be wanting in one or another of several necessary or highly desirable characteristics. For example, couplings that passed in vibration-resisting characteristics tended to fail hydraulically and mechanically in respect to leakage, or grip upon the tube, or in restriction of the fluid passage. Couplings that met the latter requirements tended to be deficient in the former particularly as lighter and thinner materials and heavier duties were sought to be employed.

It is among the objects of my invention to solve the problem stated in general terms above, and more particularly it is among the objects of my invention to provide a coupling for a pipe or tube which will receive the normally cut-off end of a tube without flaring or without the attachment of extrinsic devices or agencies, and which will firmly grip such tube or pipe and hold it mechanically and in a fluid-tight seal against high fluid pressures of the order of several thousand pounds per square inch; which will not materially or injuriously restrict the fluid passage or cross-sectional area of the tube being coupled; which will permit of the use of thin walled tubing of the lighter metals such as aluminum, and which, while carrying out these other objects will also withstand the effects of vibration which tend to be transmitted between the coupling body and the coupled tube without fracture or failure in the coupling or the tube.

Other objects include the provision of a coupling capable of carrying out the above objects which will be compact in size, light in weight, economical of manufacture and self-contained in the sense of embodying a minimum of separable parts or pieces. Another object is to provide a coupling which is fool-proof in operation and comprises such a minimum number of separate parts that it can be readily assembled without error or liability of failure, and which can be readily disassembled and reassembled a relatively great number of times without loss of or impairment to its efficiency.

Other objects and advantages will appear from the following description of certain preferred and modified forms and embodiments of my invention, reference being had to the accompanying drawings in which.

Figure 1:
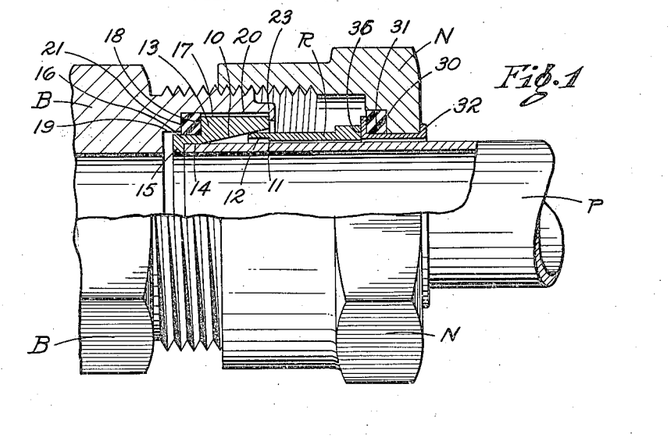
Figure 1 is a partially broken longitudinal section of a coupling containing one form of my invention with the parts in preliminary assembled relation prior to completing the joint.
Figure 2:
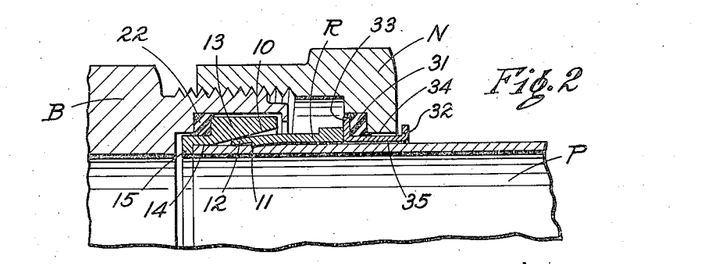
Figure 2 is similar view of the same form of my invention with the parts in fully assembled relation, i. e., with the joint completed.

In the form of my invention disclosed in Figs. 1 and 2 the pipe or tube P to be coupled is shown entering the coupling body member B and also passing through the coupling nut member N. The body B and nut N have threaded engagement with each other as shown and, as has been more fully taught in the above mentioned patents, coact through their threaded engagement to exert appropriate forces on the so-called cutting ring R which encircles the tube P and which, as it is advanced from the position shown in Figure 1 to that shown in Figure 2 in the course of completing the assembly of the parts and completing the joint formed thereby, is constricted at its forward end, the leftward end as shown herein, upon being forcefully caused to enter the inwardly tapering annular surface 10 with the result that the cutting edge 11 of the ring R enters and penetrates or scuffs into the external surface of the tube P turning up an appreciable annular curl or ridge, preferably without severing the same from the external wall of the tube and affording a very secure mechanical grip and fluid-tight joint therewith, as is more fully taught in Patents Nos. 2,139,413 and 2,211,856 for example. As those and others of the above mentioned patents also teach, the ring R with its cutting edge 11 and its leading counterbored extension 12 may take various forms coacting with the surface 10 and the tube T in the ways therein more fully and particularly described, all to the general end, however, of affording a positive mechanical grip between the ring and the tube, and also affording a fluid tight seal between the ring and the tube on the one hand and the ring and the surface 10 on the other hand.

The conical tapering surface 10 is formed preferably at an angle of about 12° from the axis thereof in a separate annular seat part 13 and preferably having an annular cylindrical surface receiving the end of the tube P as at 14 and an inwardly extending flange 15 against which the end of the tube abuts. The surface 14 tends to center the tube in the coupling and the flange 15 restrains the tube against inward movement whilst the nut N and ring R tend to force it inwardly during the step of completing the joint, compare Figs. 1 and 2, preferably as taught in the above mentioned patents.

Externally the seat part 13 has preferably cylindrical surfaces 16 and 17 and an annular shoulder 18. The surfaces 16 and 17 are spaced from the adjacent cylindrical surfaces 19 and 20 respectively of the body B to permit free movement or free vibratory movement therebetween, preferably without direct contact between the seat part 13 and the body B. Between the surfaces 19 and 20 there is preferably provided a square shoulder 21 facing and spaced from the shoulder 18, and preferably filling the space therebetween is an annular rubber or rubber-like washer or ring 22 adapted to hold and support the seat part 13 in yielding and resiliently spaced relation to the body B.

While I shall refer to the washer or ring 22 and other similar washers to be mentioned below as being of rubber-like material, my teaching is that such washers can preferably be made of rubber or so-called synthetic rubbers, depending on the nature of the fluids to be handled and other considerations known to those skilled in the art, having in mind that the gasket at least in its compressed condition shown in Figure 2 should afford a fluid-tight joint against the flow of fluid between the surfaces 16, 17, 19 and 20, should be plastic and elastic enough for that purpose and for the purpose of dampening vibration between the seat 13 and the body B. The washer 22 should also preferably have enough internal cohesion and strength to refrain from such extrusion between the adjacent spaced cylindrical surfaces as to materially impair its intended function and operation or "flow" into the fluid passage or contaminate the fluid contents thereof. Other considerations in the choice and selection of material for the washers 22 will appear in other parts of this description of my invention as the office and function of this and similar washers are more fully brought forth. Suffice to add here that I contemplate that materials differing as widely as copper, rubber, fabric and combinations thereof may advantageously serve in various of the wide range of services to which the coupling may be put and in view of the wide range of materials of which the coupling parts may be made. A major purpose being to "float" the seat 13 in relation to the body B and inhibit the transmission of vibration between the body and the tube.

For example, where the coupling parts, except the cutting ring, are made of aluminum and the fluid to be conducted is gasoline, then I prefer to use those synthetic rubber-like materials that are not adversely effected by gasoline and which have the other sealing and vibration-dampening or cushioning characteristics that I desire. The cutting ring R is preferably made of steel or at least of such material that will "take" a cutting edge as at 11 and "cut" the exterior surface of the tube as taught in the above mentioned patents.

When the part 13 and washer 22 are disposed in the body B of the coupling as shown in Figure 1, and before any of the other parts are associated therewith, I prefer to crimp or spin over a relatively light retaining flange 23 formed integrally with the open end of the body. By so doing the parts are conveniently held in the assembled relation shown in Fig. 1. The pressure exerted by the flange 23 on the end of the part 13 may be nominal or substantial, but in all events preferably less than the ultimate longitudinal force exerted on the part 13 so that the part 13 will be moved out of contact with the flange 23 when the joint is completed as shown in Figure 2.

The outer or rearward end of the ring R is urged inwardly or forwardly, compare Figs. 1 and 2, by the inward longitudinal movement of the nut N as taught in the above patents. In the instant form of my invention the nut N is formed with an inwardly facing counter-bore 30 which receives a washer 31, preferably identical with the washer 22 for the sake of uniformity and interchangeability, but not necessarily so as far as function is concerned. The washer 31 is preferably retained by an outwardly flanged collar 32, one of the flanges of which is turned or spun outwardly after the washer 31 is in place. Here also the washer is sought to be gripped preferably with little enough force in the first instance to permit the collar 32 to be entirely out of direct contact with the nut when the nut is screwed "home" as in Fig. 2. The external diameter of the body of the collar and the outer diameter of the inwardly disposed flange of the collar are each respectively somewhat less than the diameters of the adjacent bore and counterbore of the head of the nut, affording clearance as at 33 and 34 when the nut is screwed "home" so that there is no direct contact between the collar and the nut. The collar 32 also preferably clears the tube P as at 35.

While the nut is being screwed "home" the inward flange of the collar bears against the end of the ring R as at 36, permitting sliding contact therebetween, preferably on a radial plane in this form of my invention, urging the ring leftwardly in its movement from Fig. 1 to Fig. 2. The washer 31 while having no fluid sealing function has in its rubber-like qualities the office of dampening or absorbing vibration between the coupling and the tube, i. e., between the end of the ring R and the head of the nut N. While the nut is being tightened on the body of the coupling the washer 31 is proportionately compressed and it will be understood that its desirable physical characteristics include such internal cohesion and resistance to "cold flow" as to retain substantially its idle form without excessive extrusion into the clearances 33 and 34 while "floating" the collar 32 in relation to the head of the nut.

In this form of my invention it will be seen that the mechanical grip and contact between the tube and the coupling parts is confined to the inner end zone of the tube where the tube has contact or engagement with the ring R and the floating seat 13. The ring R having contact only with the tube on the one hand and the floating seat and floating collar on the other hand is "insulated" from the body of the coupling as far as the transmission of vibration is concerned. Literally, electrical insulation between such parts may also be accomplished or defeated by the choice of appropriate gasket material without sacrifice of the anti-vibration characteristics desired.

In this form of my invention the ring R and seat 13, while holding the end of the tube in firm and fluid-tight engagement, are bodily free to yield in all radial, axial, angular and torsional directions at least to the extent of absorbing vibrations acting in such or all such directions and dampening the transmission thereof and relieving particularly those parts of the tube adjacent the points by which it is engaged by the ring or the seat or both from the stresses and strains which otherwise tend to culminate at such points to fatigue the metal. In this form of my invention the outer or rearward end of the ring adjacent the collar 32 is free of contact with the tube as is preferably also the major length of the ring as shown in Figure 2.

In this way an additional freedom or floating effect is achieved through what may be considered to be a cantilever-like support of the opposite ends of the ring R, facilitating the floating of the inner end of the tube with the floating seat 13 and the inner constricted end of the ring.

Figure 3:
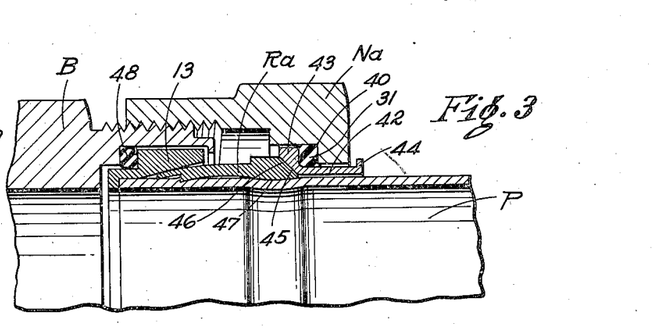
Figure 3 is a partial longitudinal section of a coupling containing another form of my invention with the parts shown in fully assembled relation with the joint completed.
Figure 3A:
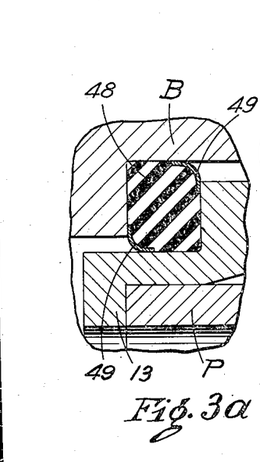
Figure 3a is an enlarged sectional view showing the details of a preferred form of gasket construction and arrangement of one of the gaskets shown in Figure 3.

In the form of my invention shown in Figs. 3 and 3a parts similar to those in Figs. 1 and 2 have been designated by the same reference numerals, and will not be again described in detail. The coupling of Fig. 3 differs from the coupling of Figs. 1 and 2 essentially in the construction and relation of the outward or rearward end of the ring Ra and the collar 42, whereby the ring is constrained to grip the tube at both ends thereof as distinguished from the grip at the inner end only in the form of my invention shown in Figs. 1 and 2. In Fig. 3 the nut Na coacts with the body B in the same way as above described, but has preferably a somewhat deeper counterbore 40 in its head whereby to receive a washer 31 which may be identical with the corresponding washer above described. Coacting with the nut Na the collar 42 may have outwardly extending radial flanges 43 and 44 of which the innermost or inwardly disposed flange 43 has an inwardly tapered or conical surface 45 adapted to bear upon the complementary inclined surface 46 at the rearward end of the ring Ra, so that relative axial motion between such surfaces tends to constrict the rearward end of the ring into tight contact with the outer wall of the tube as at 47, even to the extent of deforming the wall of the tube a little inwardly as shown in the drawings when the joint is completed. As taught particularly in the Patent No. 2,211,856 above referred to, I prefer that the slope of the conical surface 45 may be a little greater than the initial slope of the surface 46, for example, lying at 45° to the axis as compared with about 40° to the axis for the surface 46, so that as the parts are forced together the rearward end of the ring is caused to be tipped somewhat as well as forced radially inward when the nut is screwed "home." In this form of my invention I also prefer that the flange 44 be spun or flared outwardly after the washer 31 is contained between the collar and the counter bore of the nut in a preliminary assembly operation, and that the dimensions of the parts be such that after the joint has been completed the collar will clear the nut and have its bearing thereupon entirely through the washer 31, and that the collar will also clear the tube P. In this form of my invention the "floating" grip or engagement between the ring Ra with the tube will extend throughout a greater longitudinal zone of the end of the tube P, and will more fully tend to constrain the tube against whipping or vibratory whipping action with respect to the nut and body parts of the coupling.

In Figs. 3 and 3a I have also shown another modification, to wit, in the construction of the washer 48 which, corresponding to the washer 22, for the sake of illustration is disposed between the seat 13 and the body B. As shown particularly in Fig. 3a I provide at diametrically opposite corners of the washer 48 light angled metallic rings or ferrules 49 disposed in the corners where the washer otherwise tends to extrude into the zone of clearance between the seat and the body. By such a device I am able, where I find it desirable, to employ a softer material in the washer 48—one perhaps having less internal cohesion than in the washers with which such ferrules are not provided, and at the same time have been able to use greater clearances between the floating seat and the body of the coupling. I contemplate that in instances where the character of the vibration is such in relation to the parts to be protected that the washer construction of Fig. 3a may be advantageously used. Although I have not shown such a washer in detail in the other figures, it will be understood that it may be substituted in others of the forms of my invention herein illustrated and described where that may be found to be desirable under the various conditions of service to which my coupling may be put.

Figure 4:
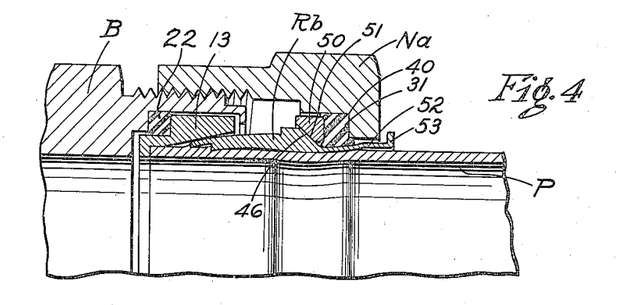
Figure 4 is a partial longitudinal sectional view of another form of my invention with the parts shown in assembled relation and the joint completed.

In Figure 4 another modified form of my invention is disclosed and here again parts which may be the same as those previously described are marked with the same reference characters in the drawings. In this form of my invention the nut Na may be the same as the nut illustrated in Figure 3 having within its counterbore 40 the washer 31 performing the same or substantially the same function ascribed to it in discussing the preceding figure, and in this form of my invention the floating seat 13 and the tube P may also have the same relation to the coupling body B and the forward end of the ring Rb now to be described. The ring Rb may at its forward or inner end be of the same construction and have the same function and mode of operation as the rings R and Ra above described, and at its rearward end may have the inclined conical surface 46 similar to that described in connection with Fig. 3, which coacts with a separate metallic ring 50 lying within the counterbore 40 in engagement with the vibration dampening washer 31. On the inner face of the ring 50 is formed a conical or tapering surface 51 which is preferably similar to the surface 45 described in Figure 3, and preferably has the same relation to the surface 46 of the ring Rb as that above described. In this form of my invention I prefer to form as an integral part of the ring Rb a rearwardly extending sleeve 52 passing through the bore of the nut with circumferential clearance and having an outwardly turned flange 53 which also clears the nut as shown in Figure 4 when the parts are screwed "home." It will also be seen that the ring 50 clears the circumferential wall of the counterbore 40 so as to avoid direct metallic contact therewith when the parts are screwed "home." In this form of my invention I make a preliminary sub-assembly of the nut Na, the ring Rb and the washers 50 and 31 with the end of the extension 52 in purely cylindrical form extending through the bore of the head of the nut. When the parts are so assembled the flange 53 is spun or pressed radially outward to the form shown in Figure 4 to hold the parts in assembled relation, and for the reasons above stated, preferably without such a grip as would maintain the flange 53 in contact with the nut after the joint is completed. In operation the coupling disclosed in Figure 4 may be substantially the same as that of the coupling disclosed in Figure 3, particularly in its anti-vibrating characteristics, albeit in this form of my invention I contemplate that compression of the washer 31 will exert a radially inward force on the adjacent part of the ring Rb, particularly the extension 52 thereof, tending to force this part directly inwardly into tight contact with the wall of the tube P, causing a mechanical grip or bearing between this part of the ring and the tube as a direct result of the compression of the rubber as the same may be augmented more or less by the coaction between the inclined surfaces 46 and 51. In this respect my teaching is, as the same will be further illustrated and exemplified, that the compression of the rubber-like washer, such as the washer 31, is availed of not only for its ultimate dampening properties but also for the purpose of deforming the cutting ring to facilitate its grip on the tube at such point or points as may be desired.

Figure 5:
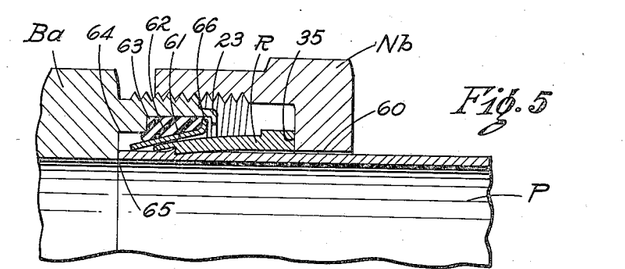
Figure 5 is a partial longitudinal sectional view of a coupling containing another form of my invention with the parts assembled and the joint completed.

In Figure 5 another modified form of my invention is disclosed. There the ring R may be the same as the ring R shown in Figs. 1 and 2 and it may have direct bearing preferably in a radial plane as at 35 with the inner radial wall of the nut Nb which may be similar to the nuts N and Na but lacking the counterbore for a vibration dampening washer and bored to a somewhat smaller diameter but clearing the tube P as at 60. The coupling body Ba may be similar to the bodies B above described in its coaction with the nut Nb and in its retention of the floating seat 61 and rubber-like washer 62 by the inwardly spun or pressed flange 23 as described in Figure 1. In this form however the body Ba is counterbored at 63 to receive the washer 62 and further counterbored at 64 to receive the innermost end of the floating seat 61 without contact therewith and to receive the innermost end of the tube P in abutting relation as at 65. The rubber-like washer 62 is preferably of greater body than the washers above illustrated and described, and the floating seat in this form of my invention may comprise merely a drawn, relatively light-walled metal cup of conical form having a radial flange or brim 66 clearing but closely approaching the wall of the counterbore 63 of the body Ba.

In this form of my invention the nut forces the ring leftwardly to the position shown in Figure 5 whilst the leftward end of the ring is constricted to a decreased diameter, cutting the tube and gripping the same as above described. The seat 61 is urged leftwardly, freeing itself from contact with the retaining flange 23 and compressing the rubber-like washer 62. As the washer 62 is compressed it reacts radially, supporting the conical wall of the seat, tending to bulge it inwardly and forcing the constriction of the end of the ring as shown. The tube P is restrained from inward movement by abutment with the body as at 65. Here the radial force acting to restrain the tube from radial movement or vibration in the longitudinal zone of contact with the tube is cushioned in the resilient support of the seat, the points of direct metallic contact 65 and 35 being axially spaced from the point of cushioned radial support.

In the forms of my invention illustrated in Figs. 6 to 11 inclusive I employ a rubber-like washer or means not only for its vibration dampening characteristic, but also for the purpose of converting the axial pressure developed between the nut and the body into radial force and movement to bring about the constriction of the ring including the cutting edge portion thereof as well as such other selected portions as are desired to grip the tube. The employment of this principle as first above mentioned in the description of Figure 4 lends itself to many variants in form and proportion of which the examples shown in Figures 6 to 11 are illustrative.

Figure 6:
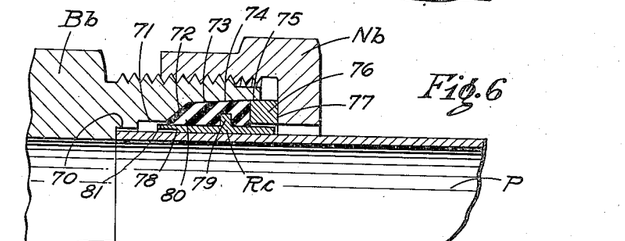
Figure 6 is a longitudinal fragmentary sectional view of another form of my invention with the parts shown in assembled relation prior to completion of the joint.
Figure 7:
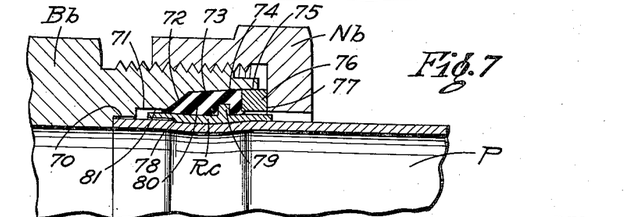
Figure 7 is a similar view showing the parts after final assembly and completion of the joint.

Referring particularly to Figures 6 and 7, the pipe or tube P has its extreme end entering the counterbore 70 in the body member Bb and bearing against the shoulder of the counterbore 70 which resists its further inward or leftward movement. The body Bb and the nut Nb, which nut may be substantially identical with the nut shown in Figure 5, have a threaded engagement with each other as shown, through which the tube-engaging instrumentalities are subjected to axially acting forces as the nut is advanced on the threads of the body from the position shown in Figure 6 to the position shown in Figure 7. In this form of my invention the body Bb is also internally bored and counterbored to present preferably a cylindrical surface 71 intersecting a high-pitched conical surface 72, which in turn intersects a low pitched conical surface 73 terminating at 74 in its intersection with a cylindrical surface 75. The surface 73 is made somewhat conical to facilitate separation of the elements after a joint has been completed, and the surface 75 is maintained cylindrical to permit the free entry of the solid preferably metallic piston-like washer or ring 76, which has a sliding radial bearing on the inner face of the nut at 77. The ring 76 has preferably a free sliding fit with the cylindrical surface 75, but clears the cutting ring Rc with measurable clearance as illustrated, it being preferable that the cutting ring Rc have no direct vibration-transmitting contact with any of the parts of the nut and body or the ring 76. In this form of my invention the ring Rc preferably has those characteristics of the cutting rings above described in that it is counterbored at its forward or inward end providing the characteristic cutting edge 78, which in its axial movement to the left from the position shown in Figure 6 to the position shown in Figure 7 accompanied by its radially inward movement in response to forces yet to be described, cuts the external surface of the tube P turning up a ridge of appreciable size and creating a firm mechanical and fluid-tight lock and bond as shown in Figure 7. In this form of my invention the ring Rc is provided with a radially outward extending flange 79 preferably spaced axially remote from the cutting edge 78. This flange among its other characteristics and functions may be varied in width and height while remaining out of contact with the nearest wall of the body of the coupling and serves to stiffen the ring Rc against radial contraction in that part of the ring adjacent to the flange.

Disposed within the main counterbore of the body Bb and surrounding generally the mid-portion of the ring Rc, including the flange 79, is a rubber-like ring or washer 80 which preferably has the physical characteristics of the washer 22 first above described, and is preferably of one piece construction as illustrated. Whether the washer 80 be made of one or more pieces it will be seen that it is disposed between the flange 79 and the ring or piston 76, whereby to transmit axial force and movement from the nut Nb to the ring Rc through the flange 79. It may also be noted that I prefer that the height of the flange 79 be such as to clear the radially opposite wall of the counterbore of the body to permit at least a little "flow" of the rubber-like material in this zone. It will also be observed that a measurable clearance is provided as at 81 between the wall 71 of the body and the external forward end of the ring Rc into which a limited amount of the rubber-like material may "flow" as it is compressed, whereby to exert radial forces acting to constrict the forward end of the ring preferably in advance of the cutting edge 78.

In the operation of this form of my invention the parts are shown in Figure 6 in assembled relation just prior to the exertion of active forces between the nut and the body. As the nut is screwed "home" on the body, the ring 76 is advanced axially from about the position shown in Figure 6 to that shown in Figure 7, compressing the rubber-like washer 80, which, having filled the space of the main counterbore in the body Bb, bulges radially inward deforming the ring Rc while the ring is advanced axially toward the end of the tube P. This combined motion as above indicated induces the cutting edge of the ring to cut into and engage the outer wall of the tube P whereby to secure it against outward movement from the coupling either under hydraulic pressure or mechanical pull. The same inward swelling of the washer 80 also tends to bulge the ring bodily inwardly in its mid-portion particularly in the zone between the flange 79 and the cutting edge 78 where the parts are proportioned as shown in these figures of the drawings, even to the extent of forcing the adjacent wall of the tube P inwardly, and affording a long tight gripping and bearing area between the inner wall of the ring behind the cutting edge terminating generally in the longitudinal zone of the flange 79 where the inward constriction of the ring may be suitably limited as above mentioned, and similarly constriction of the tube may also be limited to prevent any undesired impediment to the flow of fluid therethrough. After the parts are screwed "home" as shown in Figure 7, it will be observed that the whole radial gripping connection and support of the tube is mechanically insulated from the body of the coupling, the nut and the ring 76. The mechanical connection or bearing between the cutting ring and the tube is extended over a wide area so that particularly the whipping forces of vibration are not only dampened in their transmission from the coupling to the tube and vice versa, but are also prevented from concentrating in any limited area of contact between the tube and the coupling as a whole.

Figure 8:
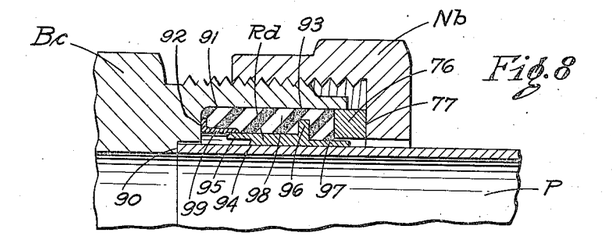
Figure 8 is a fragmentary longitudinal sectional view of a coupling containing another form of my invention with the parts in assembled relation prior to completion of the joint.
Figure 9:
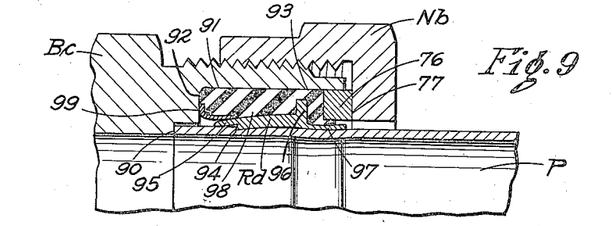
Figure 9 is a similar view of the same coupling after the parts have been completely assembled and the joint completed.

In the form of my invention illustrated in Figures 8 and 9 the parts are shown in assembled relation prior to the application of gripping forces in Figure 8 and after the application thereof in Figure 9. In this form the tube P enters the body Bc, bottoming therein in the counterbore 90 preferably with a little radial clearance as shown. The nut Nb may be the same as the nut above described having the same or substantially the same threaded engagement with the body Bc as above described in relation to the body Bb, and the ring 76 may be provided to have sliding contact with the inner face of the head of the nut in the radial plane 77 in the same way as above described. In this form of my invention the body Bc has a main counterbore 91 preferably terminating in a square bottom shoulder 92 and the longitudinal wall of this counterbore may taper a little outwardly between the shoulder 92 and about the point 93, which point 93 is inward of the maximum travel of the ring or piston 76. Here I provide a cutting ring Rd preferably having the characteristic construction at its inward or forward end, including the cutting edge 94 at the bottom of the counterbore which is also defined by the leading lip 95 of the characteristic construction, and which in this respect engages the outer surface of the tube P in the manner above described, and shown particularly in Figure 9. The ring Rd also has an outwardly extending flange 96 in its mid-portion, which in this form I prefer to have greater radial size than the flange 79 above referred to, to impart greater stiffness and resistance to contraction of the body of the ring in the neighborhood of the flange 96. In this form of ring I also provide a relatively thin rearward extension 97 extending from the rearward face of the flange 96 rightwardly as shown in the drawings and adapted to be deformed more readily than the central portion of the ring particularly adjacent to the flange 96. In this form of my invention I also provide a rubber-like washer or gasket 98 preferably, but not necessarily, of unitary construction, which surrounds the ring Rd with its flange 96 and at least prior to compression substantially fills the counterbore 91 of the body Bc as shown in Figure 8. With the rubber-like washer I provide a relatively thin-walled floating metallic collar or ferrule 99 which may be conveniently vulcanized to the inner and forward surface of the washer 98. This collar 99 bears at its forwardly flanged end on the shoulder 92 of the body Bc, and has its cylindrical longitudinally extending portion of relatively light thin walled construction adapted to yield radially inwardly under the forces exerted upon it and maintain contact with the forward lip 95 of the ring Rd as the same is deformed radially inwardly in the manner presently to be described and as shown in Figure 9.

In the operation of this form of my invention, when the nut Nb is forcibly advanced along the threads of the body Bc urging the piston-like ring leftwardly as viewed in Figures 8 and 9, and from the position shown in Figure 8 to the position shown in Figure 9, the rubber-like washer 98 filling the counterbore 91 is constrained to bulge inwardly deforming the cutting ring Rd and the collar 99 substantially as shown in Figure 9. The ring Rd is advanced axially leftward as the axial forces from the nut are exerted on the flange 96 so that the cutting edge 94 moves both leftwardly and radially inward under the combination of axial and radial forces exerted upon it, effecting its grip and bond with the exterior surface of the tube P, the leading lip 95 of the ring Rd sliding under the adjacent wall of the collar 99, both of which are deformed radially inwardly as the rubber-like washer 98 is compressed. It will be seen that the collar 99 forbids extrusion of the rubber-like material of the washer 98 beyond the confines maintained by the collar as the same is deformed more or less as shown. The portion of the rubber-like washer particularly between the flange 96 and the piston-like ring 76, in being squeezed between these parts is forced radially inwardly upon the relatively light-walled extension 97 of the ring Rd causing it to bear snugly upon the external surface of the tube P, and gripping the same firmly at that point perhaps to the extent of deforming the tube slightly as shown in Figure 9. It will be understood that the distribution of the radial gripping forces and the effects thereof in the deformation of the cutting ring Rd may be controlled and applied by proportioning of the parts, as for example in the size and stiffness of the flange 96 and in the relative thickness and stiffness of the extension 97. In all events, with the proportions substantially as shown in these figures of the drawings and with the operation above described, a positive mechanical grip is afforded between the tube and the coupling as a whole, widely spaced areas of firm gripping contact and wide areas of engagement are provided between the tube and the coupling as a whole, and the parts which have direct vibration-transmitting engagement with the wall of the tube are insulated against the transmission of vibration from the body of the coupling and the parts which have direct vibration transmitting engagement therewith, so that the tube not only has firm and fluid-tight engagement with the coupling as a whole, but is insulated therefrom in respect to the transmission of vibration.

Figure 10:
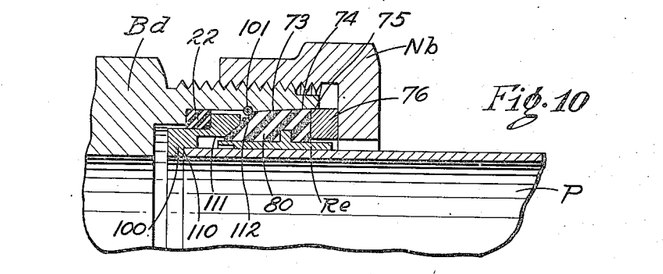
Figure 10 is a fragmentary longitudinal sectional view of another form of my invention with the parts in preliminary assembled relation.
Figure 11:
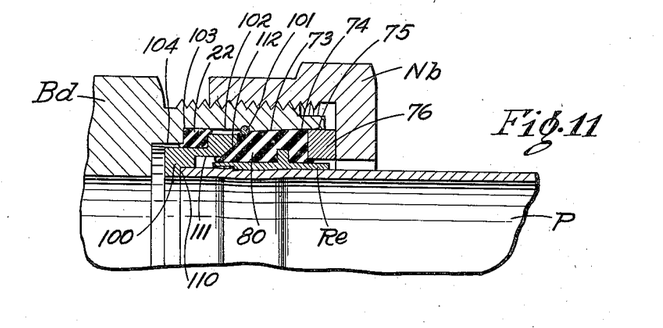
Figure 11 is a similar view showing the same parts in finally assembled relation in the completed joint.

In the form of my invention shown in Figures 10 and 11 the parts are assembled and coact in much the same way as the parts shown particularly in Figs. 6 and 7, excepting that the inner end of the tube P is bottomed in a floating seat 100 which preferably has the same relation to and coaction with the coupling body Bd as described in the forms of my invention shown, for example, in Figs. 1 and 2, excepting that in the instant form I prefer to provide for the retention of the seat 100 within the body Bd by an internal snap ring 101 which may function to retain the seat 100 in much the same way that the flange 23 served to retain the seat in the body B in Figs. 1 and 2. In this form of my invention the cutting ring Re may be the same as that described in Figs. 6 and 7 as may also be the rubber-like washer 80, the piston-like ring 76, and the nut Nb, all preferably having the same relation to and coaction with each other mentioned in connection with the form of my invention shown in Figs. 6 and 7. The nut Nb in its threaded relation to the body Bd coacts therewith in the same way as the corresponding parts in Figs. 6 and 7. The body Bd may be counterbored as shown in Figs. 10 and 11, and have the same inwardly facing tapering wall 73 extending from the snap ring 100 to the point 74 and the cylindrical wall at 75 in the same way that the like numbered parts were provided in Figs. 6 and 7. Extending inwardly of the snap ring 100 the counterbore in the body Bd preferably presents a cylindrical surface 102 terminating in the shoulder 103 and continuing with the smaller cylindrical surface 104. Upon the shoulder 103 is positioned a rubber-like washer 22 preferably the same as the washer 22 first described in Fig. 1, and serving the same function. The seat 100 has a shoulder 110 against which the inner end of the tube P abuts, and is counterbored at 111 to receive the innermost end of the ring Re and such of the rubber-like washer 80 as may be extruded thereinto as shown in Fig. 7. The seat 100 preferably also has a sharply inclined surface 112 corresponding to the surface 72 shown in Figs. 6 and 7 and serving substantially the same function. It will also be seen that the external walls of the seat 100 are preferably cylindrical and are spaced from the adjacent internal surfaces 102 and 104 of the body Bd to permit the seat 100 to float with respect to the body.

In the operation of this form of my invention, the parts, being preliminarily assembled as shown in Fig. 10, are moved and constrained to the relationship shown in Fig. 11 as the nut Nb is screwed home on the body Bd and moved leftwardly as shown in the drawings. The radially inward expansion of the washer 80 causes the same constriction of the ring Re upon the tube P, whilst the ring is being moved axially inwardly with is cutting edge engaging the external wall of the tube as described in connection with Figs. 6 and 7. When the parts are screwed home, however, the innermost end of the tube P will bear upon the shoulder 110 of the floating seat 100 so that a complete floating relationship axially, radially and torsionally is provided between the tube and the coupling as a whole.

While the foregoing has described certain preferred and modified forms of my invention in particular, a few points of general description may be added. It will be understood that the couplings particularly illustrated may be embodied in the forms of T's, elbows and the like as well as "straight fittings," and that the bodies may be formed as integral parts of other or larger instrumentalities as well as couplings per se. While I have described the nuts and bodies as having a direct threaded relationship to each other, other means such as the so-called flange type of coupling or union may be employed which have the same characteristic office and function of drawing these two major portions of the coupling in relative axial movement, exerting similar gripping forces to those above described. As in the case of some or all of the prior patents above mentioned, and as will now be known to those skilled in the art, my novel invention may be practiced with a wide range of selection of materials for the various parts of the couplings herein illustrated, consistent with the characteristics of machineability, weight, strength and the like which bear on the selection of materials for the purpose intended. Modifications and changes in the forms of my invention may occur to those skilled in the art, and I do not care to be limited in the scope of my patent to the particular or preferred forms herein illustrated and described, or in any manner other than by the claims appended hereto.

I claim:

1. A tube coupling, comprising in combination a body, an abutment for the end of a tube to be coupled and a shoulder operatively associated with said body, a rubber-like packing element within said body cooperating with said shoulder, a sleeve within the packing element having an annular part with an edge sufficiently hard to cut into the tube, and means to move said sleeve axially along the tube and to compress said packing element and by the reaction of said compressed packing element upon said sleeve force contraction of the said edge to cut into the tube.

2. The combination of claim 1 in which said rubber-like element is interposed between said abutment and said body.

3. The combination of claim 1 in which said abutment and said shoulder comprise a part separate from said body, and in which said rubber-like element is interposed between said part and said body.

4. A tube coupling, comprising in combination, a body having associated therewith an abutment for the tube to be coupled thereto, a rubber-like packing element associated with said body, a sleeve having an annular part with an edge sufficiently hard to cut into the tube, said packing element and sleeve being disposed in concentric relation with the packing outside the sleeve and interposed between it and said body, and means to move said sleeve axially along the tube to compress said rubber-like packing element and thereby to force contraction of the axially moved sleeve and cause said edge to cut into the tube, the parts being so constructed and arranged that the transmission of vibrations between said body and said tube is dampened by said packing element.

5. The combination of claim 4 with non-rubber-like means interposed between the part of said packing element near said abutment to restrain the extrusion of said packing element away from the end of the tube.

6. A tube coupling, comprising a body provided with an abutment for the end of a tube to be coupled, a sleeve about the tube having an internal annular recess at its front end and having an edge sufficiently hard to cut into the tube, a plastic packing element outside the sleeve and within the body portion and having an end portion abutting an abutment on said body portion, and means to move said sleeve axially and to cause compression of the plastic packing element and by the reaction of the compressed packing on the sleeve force it to contract and cause its edge to cut into the tube.

7. The combination of claim 6 with a deformable collar bearing on said last-named abutment and having a part entering between the adjacent end of said sleeve and said packing element and restraining displacement of said packing element beyond the end of said sleeve.

8. A tube coupling, comprising in combination, a plastic packing element, a body having an abutment for the end of the tube to be coupled and having a shoulder cooperating with the said packing element which is within the body portion, a sleeve having an internal annular recess at its front end adjacent the body, said sleeve having an edge sufficiently hard to cut into said tube, said edge being disposed below the packing at a point which is about one-third of the mean length of the packing back from the front portion and about two-thirds of the mean length of the packing away from the rear portion of said packing, and means to move the sleeve axially along the tube and cause compression of the plastic packing element and by the reaction of the compressed packing on said sleeve cause contraction of the sleeve which in turn causes the edge thereof to cut into the tube.

9. The combination of claim 8 in which said sleeve has a radial flange longitudinally spaced from said edge and limiting bodily deformation of said sleeve away from said edge, and embodied in said plastic packing element nearer the rear than the front thereof.

10. In a tube coupling, the combination of a coupling member adapted to receive the end of the tube to be coupled and having a separate seat member adapted to be engaged directly by the end of the tube, means supporting said seat member in spaced, vibration-dampening and movable relation to said coupling member, an annular cutting ring disposed on the tube to be coupled adjacent to the end thereof and engageable with said seat member, and means for forcing said ring into engagement with said seat member, said seat member having a tapering surface engaging said ring member to constrict it into cutting engagement with said tube in response to relative movement between the said ring, said surface and said tube.

11. In a tube coupling, the combination of a coupling member having a counterbore within the general confines of which the end of the tube to be coupled is disposed, a separable floating seat member disposed in said counterbore and retained therein, rubber-like means interposed between said members supporting said members in vibration-dampening and fluid-tight relation to each other, said seat member having an inner shoulder engaging the end of the tube to be coupled and having an outwardly flaring surface, a cutting ring surrounding the tube to be coupled adjacent to the end thereof and having a cutting edge and being adapted upon engagement with the outwardly flaring surface of said seat member and movement relative thereto to be constricted into cutting engagement with the tube to be coupled, means engageable with said cutting ring and said coupling member for forcing said ring into engagement with said seat member, and means for dampening transmission of vibration between said ring and said last named means.

12. In a tube coupling having a body with a flaring seat part for receiving the end of a tube to be coupled, the combination of a sleeve member surrounding said tube near the end thereof and engageable with said flaring seat and adapted upon forcible entry thereinto to be constrained into engagement with the tube, a nut member in threaded engagement with said body and adapted to exert forces directed to force said sleeve member into said seat, and rubber-like means and anti-friction means interposed between said members, said sleeve member having an extension passing through said nut member and irremovably connected therewith and retaining said rubber-like means and anti-friction means in assembled relation to said body.

13. In a tube coupling, the combination with a body to which a tube is to be coupled, a tube, a ring encircling said tube near the end thereof and having an inner edge for cutting into the tube upon combined axial and radial inward movement in respect thereto, a nut threaded onto said body for moving said ring axially in respect to said body in completing the coupling, means including at least one mass of rubber-like material interposed between said body and said nut on the one hand and said tube and said ring on the other hand so arranged that upon tightening of said nut there will be produced reactive forces effective to move said ring axially in respect to said body and said tube and radially to cause said ring to cut into said tube.

PAUL D. WURZBURGER.